United States Patent [19]

Herrod et al.

[11] Patent Number: 5,604,516
[45] Date of Patent: Feb. 18, 1997

[54] GRAPHICAL USER INTERFACE CONTROL FOR PROVIDING BOTH AUTOMATIC AND MANUAL DATA INPUT

[75] Inventors: Allan Herrod, Farmingville; John Klein, Manorville, both of N.Y.; Robert Beach, Los Altos, Calif.

[73] Assignee: Symbol Technologies, Inc., Holtsville, N.Y.

[21] Appl. No.: 269,242

[22] Filed: Jun. 30, 1994

[51] Int. Cl.⁶ .................................................. G09G 5/00
[52] U.S. Cl. ........................................ 345/168; 345/156
[58] Field of Search .................................. 345/156, 168; 235/462, 470; 395/500; 341/26

[56] References Cited

U.S. PATENT DOCUMENTS 5,034,598  7/1991  Poland .................................. 341/26 X
5,252,951  10/1993  Tannenbaum et al. ................. 345/156

FOREIGN PATENT DOCUMENTS 0354703  7/1990  European Pat. Off. .

*Primary Examiner*—Ulysses Weldon

[57] ABSTRACT

A scan-aware custom control for use in designing a graphical user interface is capable of being provided with both scanned input from a bar code reading device as well as standard keyboard input when desired by the operator. The scan-aware custom control is implemented by an applications developer in a similar fashion to standard text controls, and has custom properties to allow data entry parameters to be set at the time the interface is designed. The scan-aware custom control reads the custom property values from a preloaded properties file in order to configure the scanner interface in accordance with the desired symbologies to be decoded. The scan-aware custom control is implemented on a graphical user interface resident on a data entry terminal in order to facilitate data entry in both automatic and manual modes of entry.

1 Claim, 9 Drawing Sheets

GRAPHICAL USER INTERFACE CONTROL FOR PROVIDING BOTH AUTOMATIC AND MANUAL DATA INPUT

BACKGROUND OF THE INVENTION

1. Field of the Invention

This application relates to a graphical user interface custom control which allows both automatic data input from a bar code reader or other like automatic data entry device as well as text input manually entered by an operator.

2. Description of the Prior Art.

Many computer application programs such as those used in data collection, inventory control, databases, word processors, spreadsheets and the like employ graphical user interfaces (GUIs) which render the use of the application "user friendly." A graphical user interface provides simple interactive tools for the input, manipulation and display of data as well as program execution control through the use of windows, icons, menus, tool bars, scroll bars, command buttons, option buttons, text input boxes, dialog boxes and the like. By providing a graphical user interface, the applications developer enables the operator to run the application intuitively and with minimal or no training.

Standard development tools exist which facilitate the development of graphical user interface applications. Using a typical forms-based GUI design tool, a GUI application is divided into screens called forms which represent the major subdivisions of the user interface. Each form is composed of objects or controls with associated fields which allow data entry by the operator, display data from the program, provide instructions to the operator, allow operator control of the program, and the like. Types of controls available in commercially available GUI development tools include text boxes for alphanumeric data entry by the operator, check boxes for yes/no data entry by the operator, option buttons for choice selection by the operator, command buttons to facilitate predefined event procedures, object frames for display of a graphical object to the operator, and labels for displaying information on the form such as operator instructions.

Each control type is defined by a particular subset of properties taken from a set of standard properties which are common o all control types. Property values determine the look and behavior of the control. For Example, every control has a control name property, a control type property, and a caption property. In addition, certain control types have may have unique properties not used by other control types.

Applications developers implement their programs by selecting controls from a menu of control types and placing the control in the desired location on the form. The properties associated with the control type select are then defined by the developer in order for the control to behave in the desired fashion. Each control type is implemented by a code module that defines the behavior for that control type which can be adjusted by setting the values of the properties defined for that control type. For example, a text box control type accepts data input into its associated field from the keyboard. In a calculator application, a text box allows the operator to enter numbers from the keyboard for subsequent arithmetic computation. Other types of controls execute specified routines when selected. Thus, in the calculator application, the operator would use a pointing device such as a mouse to select a command button labeled ENTER, which calls a subroutine to calculate a certain arithmetic operation on the previously input data values.

By using predefined control types, an operator can learn to use different graphical user interfaces quickly since they appear to operate in the same fashion. That is, a command button will appear the same to the operator on different applications, and the operator will expect it to operate in the same fashion regardless of the particular application. A prime example of this are programs written for operation in the Microsoft Corp. WINDOWS environment, where different programs have similar elements such as pull-down menus, window size control buttons, help menus and dialog boxes which operate in a similar fashion in all applications.

It is desired to be able to develop such graphical user interfaces for use in applications associated with data terminals and similar devices having automatic data input capabilities such as bar code scanning. Data terminals have many applications where an operator desires to collect data either by keyboard entry or by automatic entry such as by scanning a bar code resident on a parcel package, product label, shelf tag or the like. In particular, it is desired to be able to allow the operator to have the option of either scanning a bar code with the target data encoded therein, or to enter data directly into the application if the bar code is damaged and unreadable. By providing a graphical user interface which allows both manual keyboard data entry as well as automatic bar code scanning data entry into the same field, data terminal operators can benefit from the user-friendliness and intuitive features of such graphical user interfaces.

Programmers who desire to implement automatic data entry such as bar code scanning with manual data entry into a single application have been heretofore constrained to develop routines and code on case by case basis, which is time consuming, tedious, and costly. Most often, the application so developed was different every time, so that operators always had to re-learn each new application.

It is therefore desired to furnish applications developers with a standard methodology in an applications development environment for integrating such bar code input capabilities in a convenient manner as is currently available with other features of graphical user interfaces.

It is therefore an object of the present invention to provide a custom control for a graphical user interface which is scan-aware in that it facilitates the input of text data into the field by either manual keyboard input or by an automatic bar code reading device.

It is a further object of the present invention to provide such a scan-aware custom control which operates in an intuitive fashion so as to enable an operator to use it with little or no instruction.

It is a further object of the present invention to provide such a custom control which integrates with existing applications development environments and which operates in a similar fashion to existing standard controls so as to be easily implemented by an applications developer.

SUMMARY OF THE INVENTION

In accordance with these and other objects, the present invention is a custom control for implementation in a graphical user interface development environment which is capable of allowing data entry into a single control field from either a bar code reader or from a manual or virtual keyboard, or from application code, said custom control comprising a set of custom properties comprising an entry mode property for selecting one of a plurality of possible data entry modes, a pre-processing property for defining an automatic pre-processing procedure to be implemented on the control field when it gets the focus, a post-processing property for defining an automatic post-processing procedure to be implemented on the control field when it loses the focus, and a plurality of bar code reader interface properties for defining specific parameters of operation of the bar code reader.

In an exemplary embodiment, the custom control of the present invention is implemented in a graphical user interface implemented in portable data entry/collection terminal comprising an automatic data entry device for reading data from a carrier and inputting said data into a field associated with said custom control, a manual keyboard device for providing manual keyed data into field associated with said custom control, means for configuring said custom control with a set of predefined properties comprising an entry mode property, a pre-processing property, and a post-processing property; and means for configuring said automatic data entry device with a set of predefined properties to control the operation of said automatic data entry device.

The custom control of the present invention implements the method of providing for entry of data by an operator from an automatic data reading device or from a manual keyboard device into a single control field on a graphical user interface comprising the steps of implementing a polling loop to detect if the operator has activated a key sequence on the manual keyboard device, operating on a detected key sequence by inputting data keys into the control field, implementing said polling loop to detect if the operator has activated the automatic data reading device, and processing the data from the automatic reading device by inputting the data into the control field when activation of the automatic reading device has been detected.

DESCRIPTION OF THE PREFERRED EMBODIMENT

The preferred embodiment of the present invention will now be described in detail. The custom control of the present invention is termed "scan-aware" since it will accept input into its associated field either automatically from a bar code or other automatic data reading device or manually from a keyboard or other similar manual data entry device. The scan-aware custom control of the preferred embodiment of the present invention is designed for operation with and integration into the Visual Basic for DOS Programming System (VB), which is a graphical user interface development tool as described above for use in a DOS based operating system. Reference is made to the Microsoft Visual Basic Programming System for MS-DOS Professional Edition 1.0 Professional Features Manual, and Visual Basic for DOS Inside & Out, by D. Schneider and G. Cornell, which texts are incorporated herein by reference.

The scan-aware custom control is an enhanced replacement for the standard VB text box control and in the preferred embodiment contains all the capabilities of the standard VB text box control except for multi-line input. Thus, an applications developer may use the scan-aware custom control in place of any standard text box control that does not require multi-line capabilities. The scan-aware custom control of the present invention implements certain standard property names available in the VB platform with custom definitions in order to define the control's behavior when used by the operator in the graphical user interface.

Figure 1:
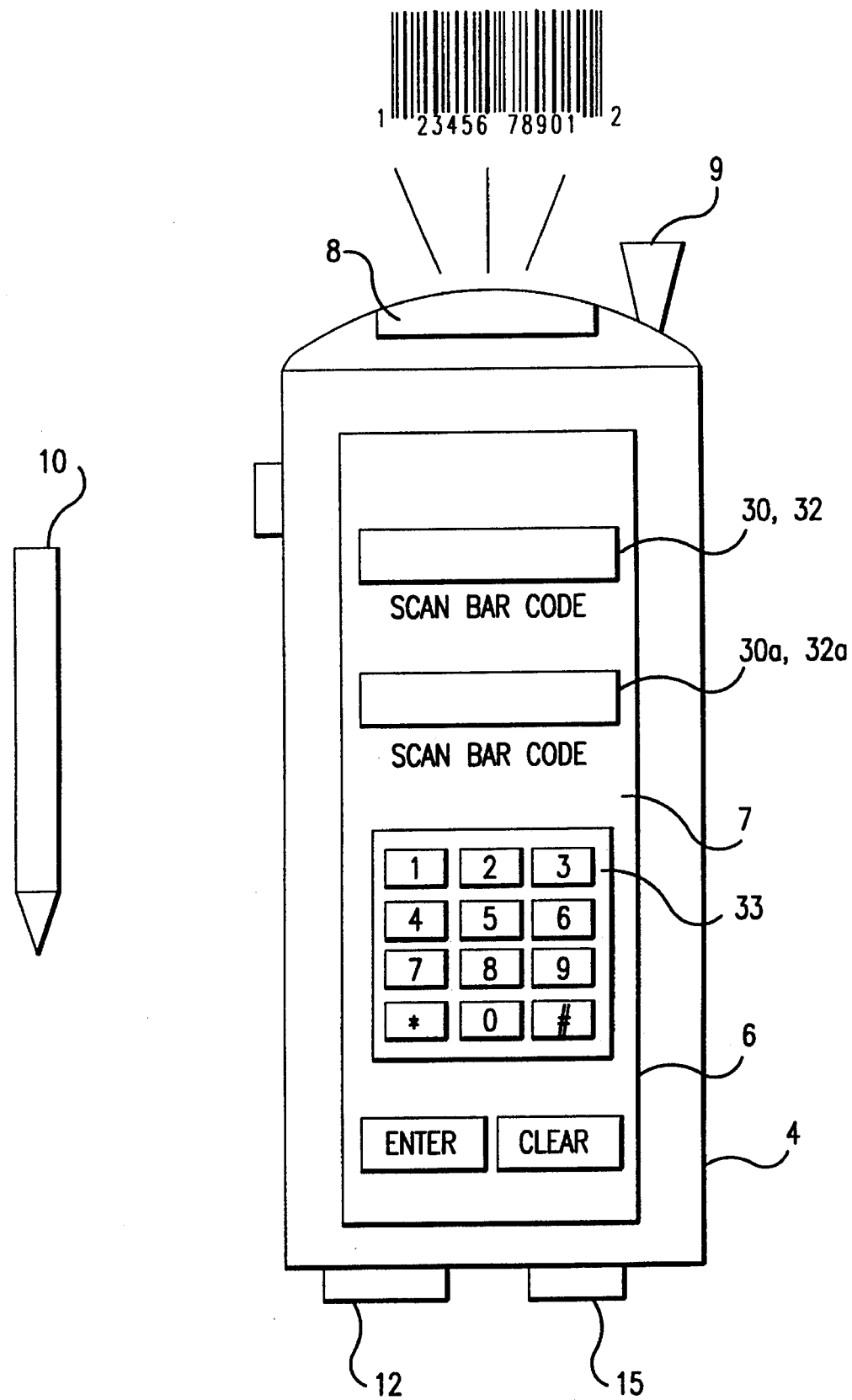
FIG. 1 is a top plan view of a preferred embodiment portable data entry terminal with a graphical user interface implementing the scan-aware custom control of the present invention.

Referring to FIG. 1, the scan-aware custom control of the preferred embodiment is integrated by an applications developer into a graphical user interface form which an operator will use for data entry and retrieval on a scanner integrated portable data collection terminal 2 such as the PPT4100 Portable Pen Terminal with Integrated Scanner, which is marketed by Symbol Technologies, Inc., the assignee of the present invention. FIG. 1 is a perspective view of the terminal 2, which comprises a housing 4, a touch sensitive screen 6 for displaying various forms 7 of the graphical user interface to an operator and for accepting input from the operator, a stylus 10 for interfacing with the touch sensitive screen 6, a keyboard I/O port 12 for connecting an optional data entry keyboard, a mouse I/O port 15 for connecting an optional mouse pointing device 14, and a bar code scanning module 8 which is located at the top end of the housing 4. The bar code scanning module 8 in the preferred embodiment is laser-based and may be of any type well known in the art which generates a visible laser beam, scans the beam across a bar code with an oscillating mirror or like device, uses a photodiode to detect the scanned beam which is reflected off the bar code, and provides a detected signal for subsequent processing and decoding to generate data indicative of the target bar code. In the alternative, a CCD type scan module may be used, which provides a sheet of light to flood the target bar code and detects the reflected signal with a linear CCD array for further processing.

The exemplary form 7 illustrated in FIG. 1 comprises a field 30 which is associated with a scan-aware custom control 32 of the present invention. The field 30 allows the operator to automatically scan or manually key a data string into the custom control 32 and/or displays the current data string to the operator for viewing.

The touch-sensitive screen 6 operates in a fashion well known in the art; i.e. an operator uses the stylus 10 to touch the desired area of the screen 6 in order to make the selection, enter data, etc.

The terminal 2 of the preferred embodiment also comprises an antenna 9 for facilitating RF communications between the terminal 2 and a base station (not shown) in a manner well known in the art. The terminal 2 operates under battery power, which facilitates its portable mode of operation.

In addition to being implemented on the preferred embodiment scanner integrated pen-based data entry terminal 2, the custom control 32 of the present invention may be used with a data entry terminal with bar code scanning capabilities housed in a separate unit. For example, a point-of-sale each register operating a graphical user interface which has a hand-held or stationary bar code scanner connected thereto may implement the custom control 32 for automatic and manual data entry.

Figure 2:
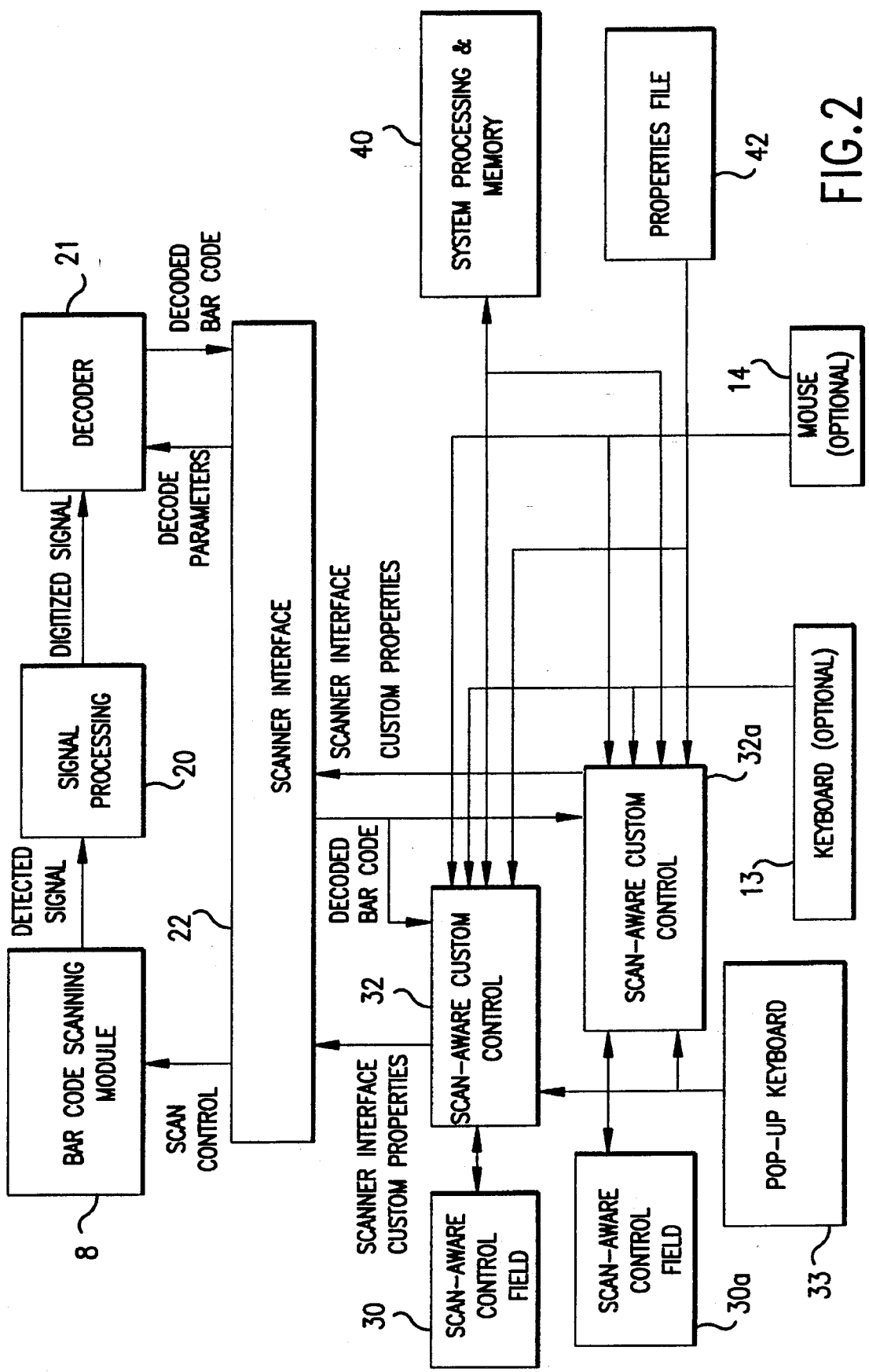
FIG. 2 is a block diagram of the terminal of FIG. 1.

FIG. 2 is a block diagram of the terminal 2 of the preferred embodiment. The bar code scan module 8 provides a detected reflected signal to a signal processing circuit 20. This circuit amplifies and digitizes the detected signal, and the decoder 21 decodes the digitized signal in a manner well known in the art in order to provide an ASCII or other data representation of the scanned bar code. The scanner interface 22 functions as a control and data interface between the laser scan module 8, the signal processing circuit 20, the decoder 21 and the scan-aware custom control 32. The scanner interface 22 provides scan control signals to the laser scan module 8 in order perform operations such as initiate scanning, terminate scanning and the like, and it provides decode parameter information to the decoder 21 in order to control which symbology should be decoded. This scan control and decode parameter information is provided by the scan-aware custom control 32 which currently has the focus in accordance with its property settings and the operator interaction. After the bar code has been scanned, the scanner interface 22 provides the decoded bar code signal to the scan-aware custom control 32 from the decoder 21, and the scanned bar code is displayed in the field 30 associated with the custom control 32 for operator viewing.

When applicable, a keyboard 13 provides hard key data to the scan-aware custom control 32 via the I/O port 12 shown in FIG. 1. A pointing device such as a mouse 14 can also be connected to the I/O port 15 if desired for data input or program control. In the alternative, as will be described below, the applications developer can program the scan-aware custom control 32 to allow the operator to select an optional pop-up keyboard 33 to appear on the touch-sensitive screen 6. The pop-up keyboard 33 provides a selection of soft keys on the screen 6 which emulate a standard keyboard in order to allow keyed data entry without requiring the external keyboard 13. The operator taps the desired soft key with the stylus 10. The data string entered by the operator is also displayed in the associated field 30 in the same manner as a scanned bar code.

The scan-aware custom control 32 interacts with system processing and memory means 40 in a manner well known in the art to provide input data (bar code or keyed entry) entered into its associated field 30 and to get and lose the focus in accordance with the operator's interaction.

Terminal Operation

An operator interacts with the scan-aware custom control of the present invention in the pen entry based terminal 2 of the preferred embodiment as follows. The screen 6 displays to an operator the graphical user interface which is comprised of one or more forms 7 for data entry, data access and/or program manipulation. Embedded within the forms are various standard controls well known in the prior art as well as one or more scan-aware custom controls 32 of the present invention. The screen 6 shown in FIG. 1 illustrates a form 7 comprising a field 30 which is associated with a scan-aware custom control 32 of the present invention. In an alternative mode of operation, an optional keyboard 13 (not shown) is connected to the keyboard I/O port 12 to provide keyed data entry if desired and an optional mouse 14 is connected to the I/O port 15 for program execution control.

The scan-aware custom control 32 can get the focus for data entry in various ways; for example, by the operator selecting the field 30 with the stylus 10, by default upon the form 7 being loaded to the screen 6, by default after data has been entered into a previous record, by a command button control being touched with the stylus 10, or by the custom control 32 being the next control in a tab selection when the optional keyboard 13 is used.

Figure 7:
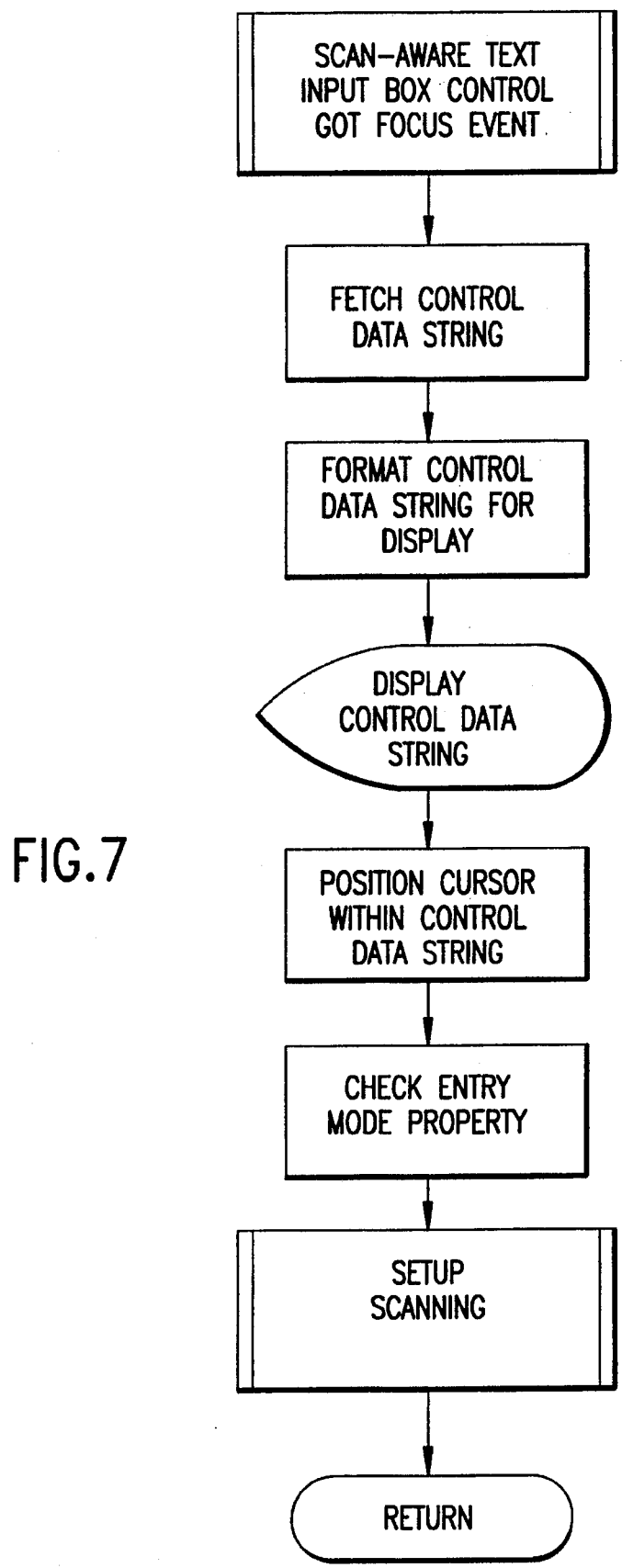
FIG. 7 is a flowchart for the initialization process implemented by scan-aware custom control of the present invention.
Figure 8:
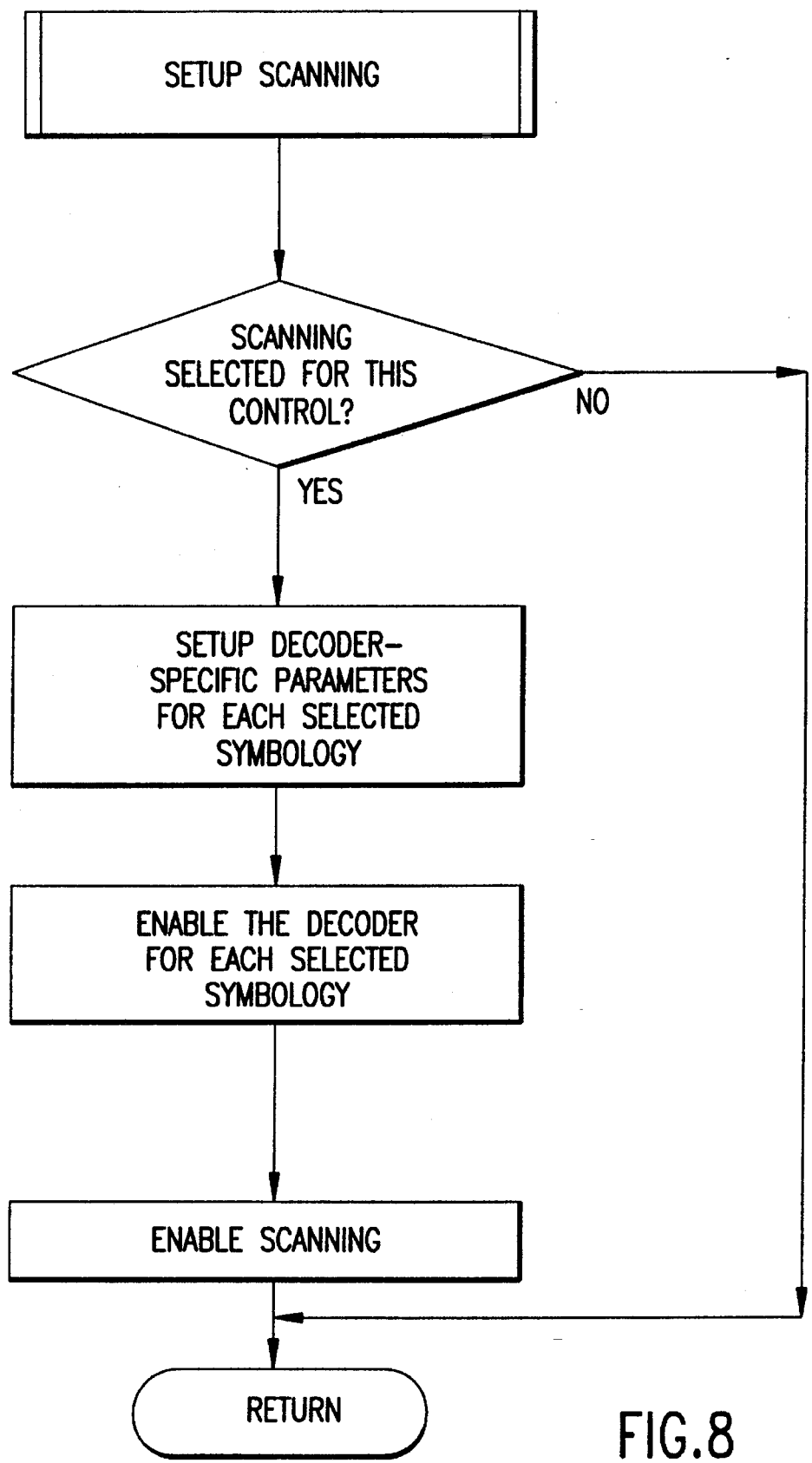
FIG. 8 is a flowchart for a Setup scan subroutine called by the flowchart of FIG. 7.

Once the scan-aware custom control 32 gets the focus, certain initialization activities take place. Referring to the flowchart shown in FIG. 7, the control data string is fetched frown the control field 30, formatted for display, and displayed on the screen 6. The cursor is then positioned within the control data string at the appropriate location in the field 30, which may be in the first location if the data string is empty. The custom control 32 then looks at the value of a custom property labeled Entry_Mode to ascertain which one of four predefined modes of operation the applications developer has selected for data input: Scan and Keys with Lockout, Scan and Keys with Auto Clear, Scan and Keys with Append, and Scan Only, as shown in Table A.

TABLE A

| Property Value | Entry_Mode Property | |
|---|---|---|
| | Default | Value Definition |
| 0 | 0 | Scan and Keys with Lockout |
| 1 | | Scan and Keys with Auto Clear |
| 2 | | Scan and Keys with Append |
| 3 | | Scan Only |

When the Scan and Keys with Lockout mode is used, both scanned data from the scan module 8 and keyed entry are allowed in the field 30. Anytime keystrokes enter the field 30, scanning is disabled until the field becomes empty. Keystrokes are appended to the end of the field 30 or inserted (or overtyped, depending on the insert mode) at the cursor position within the field. This mode allows an operator to first try to scan a bar code, and then to enter data into the field 30 manually if scanning is unsuccessful. Once keyed data entry begins, the scanner is disabled so that only keyed data can complete the field. The Entry_Mode property will default to this value if the applications developer does not make a specific value selection.

For the Scan and Keys with Auto Cleat mode of operation, both scanned data and key entry are allowed in the field 30, and anytime scanning occurs the field is cleared and overwritten with the scanned data. Keystrokes are appended to the end of the field 30 or inserted at the cursor position within the field. Scanning can occur at any time with this mode.

For Scan and Keys with Append, both scanned data and keys are allowed in the field 30, and anytime keystrokes or scanned data enter the field all data is appended to the end of the field or inserted at the cursor position. Scanning and keystrokes can occur at any time.

When Scan Only is selected, only scanned data is allowed in the field 30, and keystrokes are ignored. The field is cleared and any incoming scanned data overwrites what is currently in the field.

In addition to reading the Entry_Mode property, the custom control 32 reads a Preprocess property and a Postprocess property set by the applications developer. When the Preprocess property is set to the value of 1, the data field 30 is cleared to blanks when the scan-aware custom control 32 gets the focus, and by setting it to the value 0, the data field 30 is left as is and is not cleared to blanks when the scan-aware custom control 32 gets the focus. By setting the Postprocess property to 0, the next control automatically gets the focus after the field 30 is filled with data, and by setting it to a value of 1, the scan-aware custom control keeps the focus even after the field 30 has been filled with data (the focus must then be changed manually by the operator).

The Entry_Mode, Preprocess, and Postprocess properties are used by the scan-aware custom control to direct its operation as defined by the values in the properties. The property values are set by the applications developer and stored in a Properties file (.PRP) 42, which is accessed by the scan-aware custom control 32 each time it gets the focus as part of the initialization process. In addition, the .PRP file also stores values for various custom properties which are used to configure the scanner interface 22 for the scan-aware custom control 32 which currently has the focus. These properties set the various decode parameters, specify which particular symbologies are to be enabled or disabled, set check digit parameters, set an autodiscriminate function, and the like. Table B below lists those custom properties stored in the .PRP file of the preferred embodiment which are written to the scanner interface 22 every time the custom control 32 gets the focus. All scanner and decode control is executed through the scanner interface 22 in a fashion well known in the art; the scan-aware custom control 32 is thus configured with custom properties to correlate to those inputs required by the particular scanner interface 22 being implemented. Thus, each scan-aware custom control 32 has custom properties stored in the .PRP file which (1) configure the custom control's mode of operation, including pre-processing and post-processing options, and (2) configure the scanner interface 22 as desired.

TABLE B

Scanner Interface Custom Porperties

| Property Name | Property Value | Value Definition | Default |
|---|---|---|---|
| UPCE0 | 0 | Disable symbology UPCE0 | 1 |
|  | 1 | Enable symbology UPCE0 |  |
| UPCE0_minlength | 0 to 65535 | Minimum length number of characters | 0 |
| UPCE0_maxlength | 0 to 65535 | Maximum length number of characters | 0 |
| UPCE0_alloc | 0 to 20 | Number of specific decoder parameters | 3 |
| UPCE0_ret_CD | 0 | Do not return check digit | 0 |
|  | 1 | Return check digit |  |
| UPCE0_preamble | 0 | No number system, no country code | 0 |
|  | 1 | No number system, country code |  |
|  | 2 | Number system, country code |  |
| UPCE0_convert | 0 | Do not convert UPCE0 to UPCA | 0 |
|  | 1 | Convert UPCE0 to UPCA |  |
| UPCE1 | 0 | Disable symbology UPCE1 | 1 |
|  | 1 | Enable symbology UPCE1 |  |
| UPCE1_minlength | 0 to 65535 | Minimum length number of characters | 0 |
| UPCE1_maxlength | 0 to 65535 | Maximum length number of characters | 0 |
| UPCE1_alloc | 0 to 20 | Number of specific decoder parameters | 3 |
| UPCE1_ret_CD | 0 | Do not return check digit | 0 |
|  | 1 | Return check digit |  |
| UPCE1_preamble | 0 | No number system, no country code | 0 |
|  | 1 | No number system, country code |  |
|  | 2 | Number system, country code |  |
| UPCE1_convert | 0 | Do not convert UPCE1 to UPCA | 0 |
|  | 1 | Convert UPCE1 to UPCA |  |
| UPCA | 0 | Disable symbology UPCA | 1 |
|  | 1 | Enable symbology UPCA |  |
| UPCA_minlength | 0 to 65535 | Minimum length number of characters | 0 |
| UPCA_maxlength | 0 to 65535 | Maximum length number of characters | 0 |
| UPCA_alloc | 0 to 20 | Number of specific decoder parameters | 2 |
| UPCA_ret_CD | 0 | Do not return check digit | 1 |
|  | 1 | Return check digit |  |
| UPCA_preamble | 0 | No number system, no country code | 1 |
|  | 1 | No number system, country code |  |
|  | 2 | Number system, country code |  |
| MSI | 0 | Disable symbology MSI | 1 |
|  | 1 | Enable symbology MSI |  |
| MSI_minlength | 0 to 65535 | Minimum length number of characters | 4 |
| MSI_maxlength | 0 to 65535 | Maximum length number of characters | 55 |
| MSI_alloc | 0 to 20 | Number of specific decoder parameters | 3 |
| MSI_redundancy | 0 | Disabled | 0 |
|  | 1 | Enabled |  |
| MSI_CD | 1 to 2 | Number of check digits | 1 |
| MSI_ret_CD | 0 | Do not return check digit | 0 |
|  | 1 | Return check digit |  |
| EAN8 | 0 | Disable symbology EAN8 | 1 |
|  | 1 | Enable symbology EAN8 |  |
| EAN8_minlength | 0 to 65535 | Minimum length number of characters | 0 |
| EAN8_maxlength | 0 to 65535 | Maximum length number of characters | 0 |
| EAN8_alloc | 0 to 20 | Number of specific decoder parameters | 1 |

TABLE B-continued

Scanner Interface Custom Porperties

| Property Name | Property Value | Value Definition | Default |
|---|---|---|---|
| EAN8_convert | 0 | Do not convert EAN8 to EAN13 | 0 |
| | 1 | Convert EAN8 to EAN13 | |
| EAN13 | 0 | Disable symbology EAN13 | 1 |
| | 1 | Enable symbology EAN13 | |
| EAN13_minlength | 0 to 65535 | Minimum length number of characters | 0 |
| EAN13_maxlength | 0 to 65535 | Maximum length number of characters | 0 |
| EAN13_alloc | 0 to 20 | Number of specific decoder parameters | 0 |
| Codabar | 0 | Disable symbology Codabar | 1 |
| | 1 | Enable symbology Codabar | |
| Codabar_minlength | 0 to 65535 | Minimum length number of characters | 0 |
| Codabar_maxlength | 0 to 65535 | Maximum length number of characters | 0 |
| Codabar_alloc | 0 to 20 | Number of specific decoder parameters | 3 |
| Codabar_redundancy | 0 | Disabled | 0 |
| | 1 | Enabled | |
| Codabar_CLSI | 0 | Disabled | 0 |
| | 1 | Enabled | |
| Codabar_NOTIS | 0 | Disabled | 0 |
| | 1 | Enabled | |
| Code39 | 0 | Disable symbology Code39 | 1 |
| | 1 | Enable symbology Code39 | |
| Code39_minlength | 0 to 65535 | Minimum length number of characters | 0 |
| Code39_maxlength | 0 to 65535 | Maximum length number of characters | 0 |
| Code39_alloc | 0 to 20 | Number of specific decoder parameters | 4 |
| Code39_CD | 0 | Disabled | 0 |
| | 1 | Enabled | |
| Code39_concat | 0 | Disabled | 0 |
| | 1 | Enabled | |
| Code39_full_ASCII | 0 | Disabled | 0 |
| | 1 | Enabled | |
| Code39_redundancy | 0 | Disabled | 0 |
| | 1 | Enabled | |
| D2of5 | 0 | Disable symbology D2of5 | 1 |
| | 1 | Enable symbology D2of5 | |
| D2of5_minlength | 0 to 65535 | Minimum length number of characters | 0 |
| D2of5_maxlength | 0 to 65535 | Maximum length number of characters | 14 |
| D2of5_alloc | 0 to 20 | Number of specific decoder parameters | 1 |
| D2of5_redundancy | 0 | Disabled | 0 |
| | 1 | Enabled | |
| I2of5 | 0 | Disable symbology I2of5 | 1 |
| | 1 | Enable symbology I2of5 | |
| I2of5_minlength | 0 to 65535 | Minimum length number of characters | 14 |
| I2of5_maxlength | 0 to 65535 | Maximum length number of characters | 10 |
| I2of5_alloc | 0 to 20 | Number of specific decoder parameters | 1 |
| I2of5_redundancy | 0 | Disabled | 0 |
| | 1 | Enabled | |
| Code11 | 0 | Disable symbology Code11 | 1 |
| | 1 | Enable symbology Code11 | |
| Code11_minlength | 0 to 65535 | Minimum length number of characters | 4 |
| Code11_maxlength | 0 to 65535 | Maximum length number of characters | 55 |
| Code11_alloc | 0 to 20 | Number of specific decoder parameters | 3 |
| Code11_redundancy | 0 | Disabled | 0 |
| | 1 | Enabled | |
| Code11_CD | 0 to 2 | Number of check digits | 1 |
| Code11_ret_CD | 0 | Do not return check digit | 0 |
| | 1 | Return check digit | |
| Code93 | 0 | Disable symbology Code93 | 1 |
| | 1 | Enable symbology Code93 | |
| Code93_minlength | 0 to 65535 | Minimum length number of characters | 0 |
| Code93_maxlength | 0 to 65535 | Maximum length number of characters | 0 |
| Code93_alloc | 0 to 20 | Number of specific decoder parameters | 1 |
| Code93_redundancy | 0 | Disabled | 0 |
| | 1 | Enabled | |
| Code128 | 0 | Disable symbology Code128 | 1 |
| | 1 | Enable symbology Code128 | |
| Code128_minlength | 0 to 65535 | Minimum length number of characters | 0 |
| Code128_maxlength | 0 to 65535 | Maximum length number of characters | 0 |
| Code128_alloc | 0 to 20 | Number of specific decoder parameters | 1 |
| Code128_redundancy | 0 | Disabled | 0 |
| | 1 | Enabled | |
| security_level | 0 | No security checking | 0 |
| | 1 | Check ambiguous characters | |
| | 2 | Check all characters | |
| supp_2 | 0 | Disabled | 0 |
| | 1 | Enabled | |

TABLE B-continued

Scanner Interface Custom Porperties

| Property Name | Property Value | Value Definition | Default |
|---|---|---|---|
| supp_5 | 0 | Disabled | 0 |
| | 1 | Enabled | |
| supp_autodiscriminate | 0 | Disabled | 0 |
| | 1 | Enabled | |
| supp_retry | 2 to 10 | Retry count before reporting | 5 |
| linear_decode | 0 | Disabled | 0 |
| | 1 | Enabled | |

The .PRP file can support multiple scan-aware custom controls with different or the same properties. In FIGS. 1 and 2, a second scan-aware custom control 32a is shown with its associated field 30a on the form 7. The custom control 32a accesses the .PRP file in the same manner as described above when it gets the focus. If the second custom control 32a has identical property values as the first custom control 32, it will look to the same location in the .PRP file address map. If its property values are different than those of the custom control 32, the custom control 32a will have its own unique location in the .PRP address map to read its custom property values when it gets the focus.

At runtime when the first scan-aware custom control 32 is loaded for the first time, it will open the .PRP file according 16 the project's name and parse the information in the file. As described, the file may contain sections for many scan-aware custom controls on a particular form. A list is created in memory which contains all the information about all the controls and their settings. Thus, the file is read and parsed once and only once. In addition to building this list, scanning is enabled which initializes scanning. Even though scanning is enabled, the laser will not come on until a read is pending.

A reference count of how many, custom controls are loaded is kept while the program is active. Each time a custom control is loaded the count is incremented. Each time a custom control is unloaded, the reference count is decremented. When the reference count gets to zero, the list is destroyed and scanning is disabled. Each time the custom control gets the focus its settings are obtained from the list, and the scanning settings are written to the scanner interface 22. Then the custom control posts a read from the scanner interface 22. The field 30 is enabled, and as events occur they are handled by the custom control. When the custom control loses the focus, any pending read is canceled.

In addition to the extended custom properties set stored in the .PRP file as described above, the scan-aware custom control of the present invention implements the .Drive, .Action, and .Value properties, which are not stored in the .PRP file but are a part of the control itself. These properties function to work the scan-centric modes of data entry of the present invention.

The standard property .Drive is used to store the name of the form and the name of the custom control for which the scanning information in the (.PRP) file relate to the control. Thus, if .Drive is a null field, the scan aware custom control has not been selected for scanning and has been selected for use only as a text input box by the application developer.

The standard properties .Action and .Value are used by the custom control to determine the source of the data in the field 30 and the bar code type, respectively. The standard property .Action is read by the application to determine the source of the data in the field. The .Action property can be SOURCE_NONE (no data entered in the field), SOURCE_KEYBOARD (data comes from the keyboard), or SOURCE_SCANNER (data comes from the scanner). The .Value standard property determines the bar code type read when the .Action property isSOURCE_SCANNER. The .Value property can be BC_NONE (undetermined bar code), BC_UPC_E1 (UPC E1 label type scanned), BC_UPC_A (UPC A label type scanned), BC_MSI (MSI label type scanned), BC_EAN_8 (EAN 8 label type scanned), BC_EAN_13 (EAN 13 label type scanned), BC_CODABAR (Codabar label type scanned), BC_CODE_39 (Code 39 label type scanned), BC_D_2 OF_5 (D 2 of 5 label type scanned), BC_CODE_11 (Code 11 label type scanned), BC_CODE_93 (Code 93 label type scanned), BC_CODE_128 (Code 128 label type scanned), BC_PDF_417 (PDF417 label type scanned).

Operation of Scan-Aware Custom Control

Figure 3:
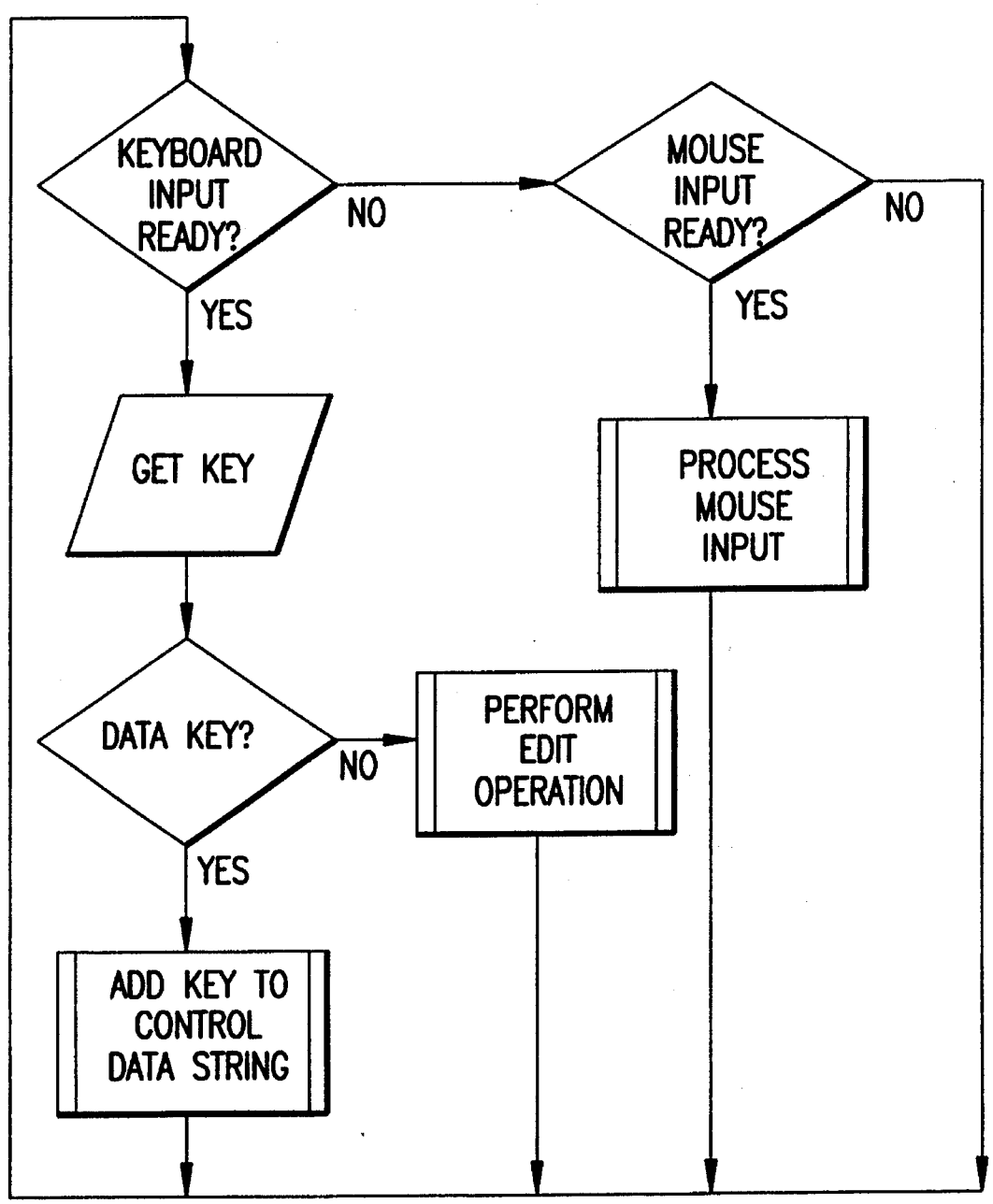
FIG. 3 is a flowchart of a polling loop implemented by a prior art text input control.

After the scan-aware custom control 32 gets the focus and accesses the .PRP file to configure the scanner interface 22, it executes a timer polling loop and waits for operator interaction. The scan-aware custom control 32 behaves in some ways as a standard VB text input box well known in the prior art. FIG. 3 illustrates a flowchart of a polling loop used by a prior art text input box control used with Visual Basic. When a prior art text input box control has the focus, it is constantly polling the keyboard 13 and the mouse 14 to see if any input activities related to the control have occurred. If keyboard activity occurs, the key pressed by the operator may be a data key or an editing key. Data keys are added to the data string being collected by the control field. Editing keys may produce local changes within he control field such as moving the cursor, erasing characters, etc.) or may change the focus to another control. If mouse activity occurs, it may produce local changes within the control field (such as moving the cursor) or may change focus to another control. If the focus has not changed and remains with the current text input box control, the input poll continues cycling in the same fashion.

Figure 4:
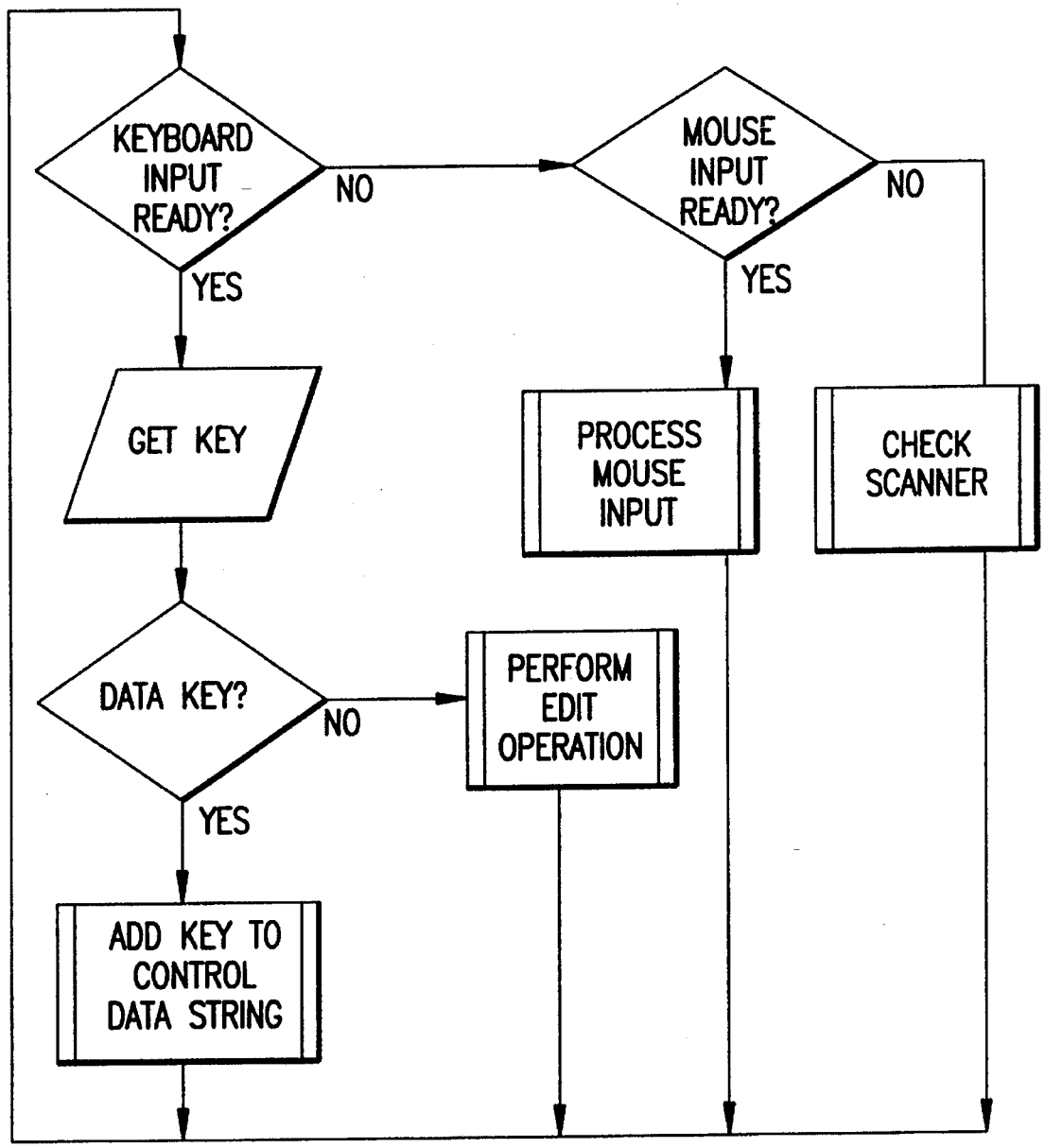
FIG. 4 is a flowchart of a polling loop implemented by the scan-aware custom control of the present invention.

To incorporate bar code scanning into a text input box control, the present invention introduces an additional check into the polling loop to test for scanning input. As shown in the flowchart of FIG. 4, the polling loop performs a Check Scanner routine in every polling cycle after checking for keyboard input and mouse input in order to process bar code data as required. If scanning input is ready, then the data must be added to the data string being collected by the control in a manner similar to that used for data keys.

Figure 5:
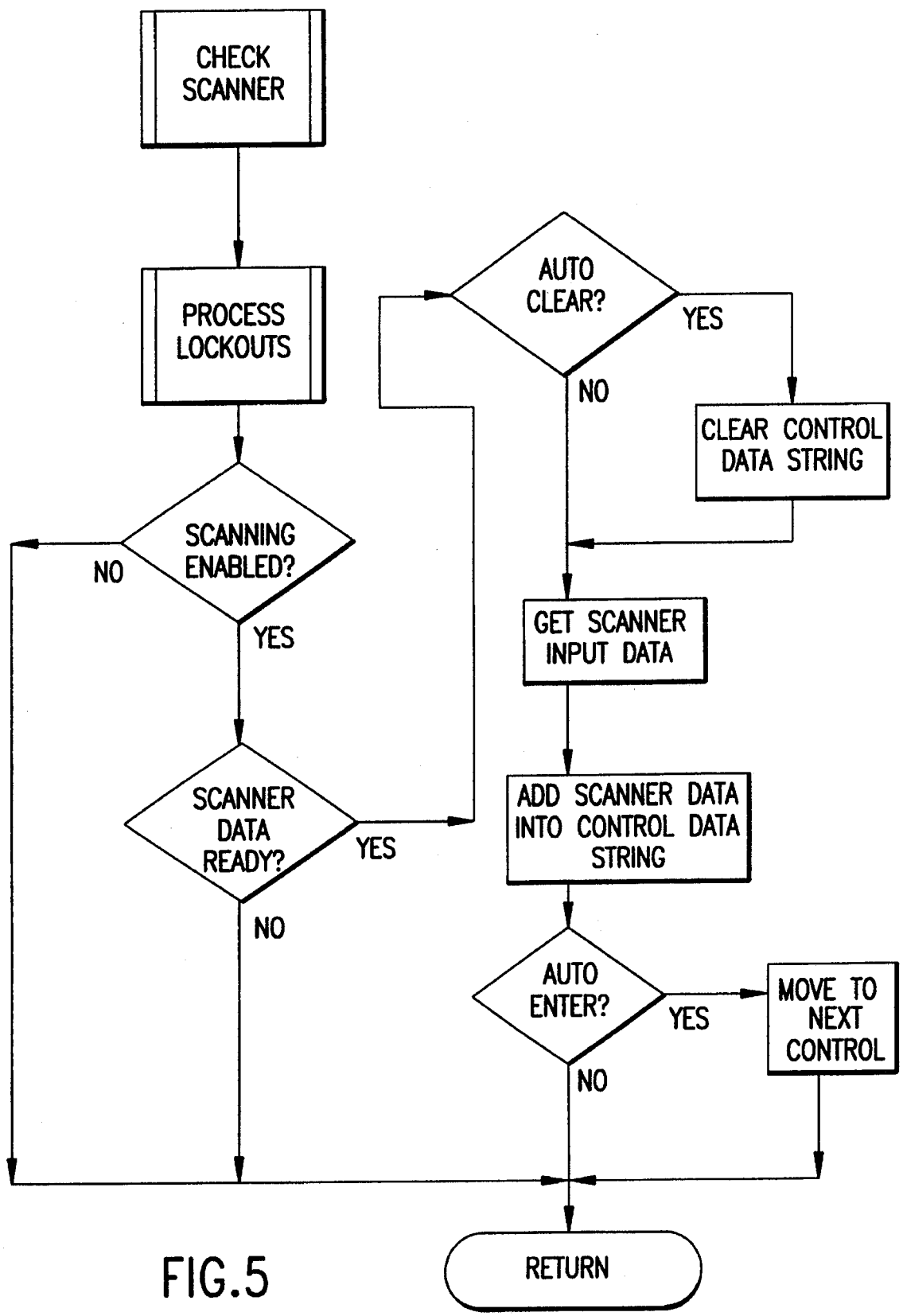
FIG. 5 is a flowchart for a check Scanner routine called by the polling loop of FIG. 4.

FIG. 5 shows a flowchart of the steps performed by the scan-aware custom control when implementing the Check Scanner routine. First, a Process Lockouts subroutine is run, which checks to ensure that the scanning input should be enabled or if it should be disabled and locked out of the data field.

Figure 6:
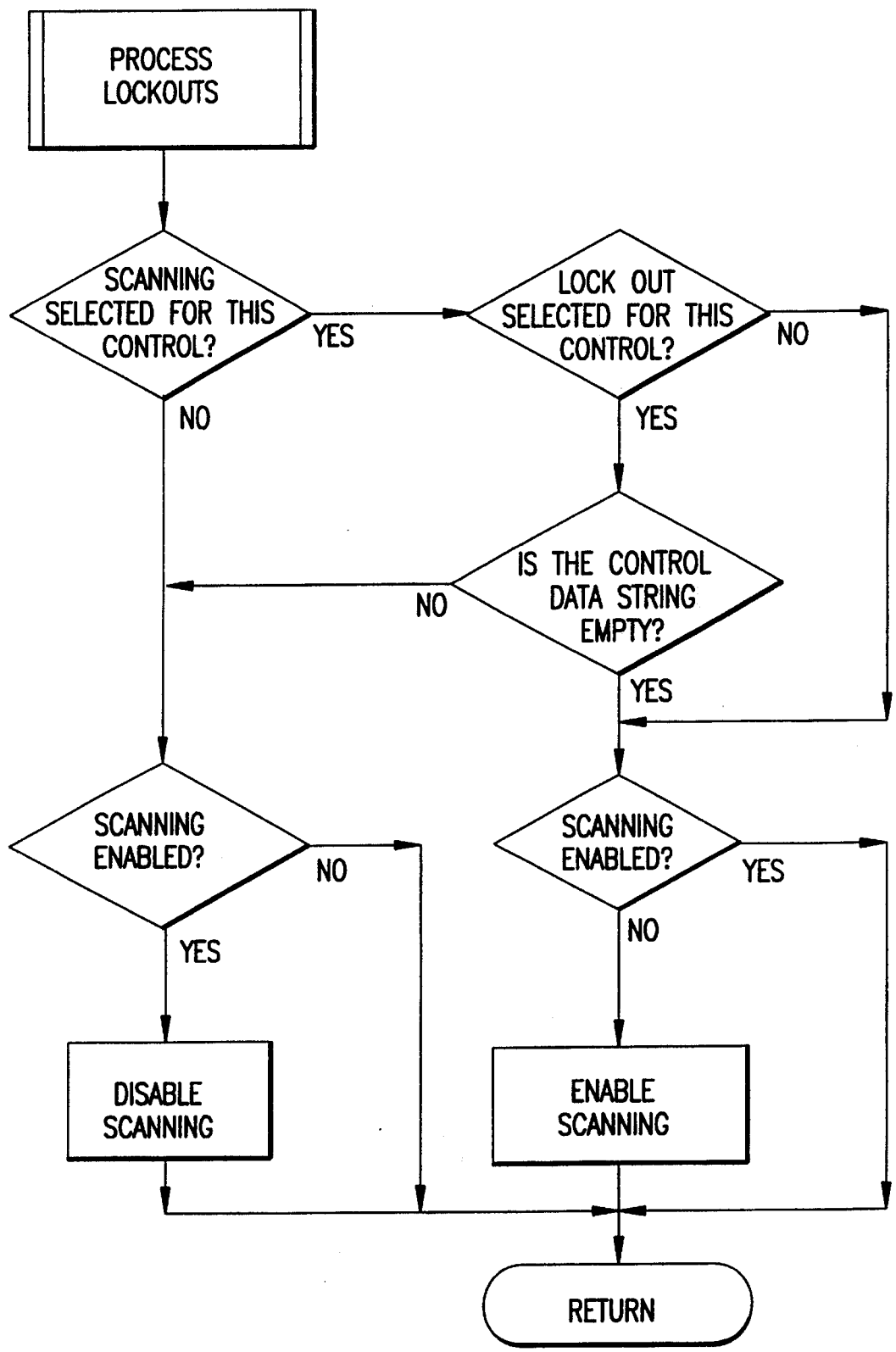
FIG. 6 is a flowchart for a Process Lockouts subroutine called by the Check Scanner routine of FIG. 5.

A flowchart for the Process Lockouts subroutine is shown in FIG. 6 and operates as follows. If scanning has been selected by the applications developer for this scan-aware custom control, (the .Drive property does not contain a null string) the Process Lockouts routine then checks to see if the Lock Out option has been set by reading the Entry_Mode property. If Entry_Mode has a value of 1, 2 or 3, then Lock Out has not been selected by the applications developer, and the scanner is enabled via the scanner interface 22 and the subroutine returns to the Check Scanner routine. If Entry_Mode has a value of 0, then Lock Out has been selected, and the subroutine checks to see if the data string in the field 30 is empty. If the data string is empty, then the scanner is likewise enabled via the scanner interface 22 and the subroutine returns to the Polling Loop; if not empty, then the scanner is disabled in the same manner.

If bar code scanning has not been selected by the applications developer for this scan-aware custom control (the .Drive property is empty) then the subroutine simply returns without enabling the scanner. The scanner will have been disabled when focus was lost on the previous control.

As shown in FIG. 5, if scanning is, disabled by the Process Lockouts subroutine, the Check Scanner routine simply returns to the main polling loop to continually check for keyboard input and mouse input. If, however, scanning input is determined by the Process Lockouts subroutine to be enabled, the Check Scanner routine checks the interface 22 to see if a bar code has been scanned by the operator. If no bar code data has been scanned by the operator then the Check Scanner Routine returns to the Polling Loop. If, however, bar code data had been scanned by the operator, the Action property is set by the control to SOURCE_SCANNER and the Check Scanner routine will proceed to process the bar code data.

If the Preprocess property returns a value of 1, then the Auto Clear option had been set by the applications developer, and any data previously entered by the operator into the control field 30 will be cleared. If Preprocess is a value of 0, then Auto Clear was not set, and the bar code data scanned by the operator will simply be concatenated onto whatever data is already in the control field 30. A custom event is generated to tell the application that scanned data has been entered in the field.

The bar code data scanned by the operator will then be added into the data string in the control field 30 in the same fashion as if it were typed into the keyboard by the operator. If the Postprocess property reads a value of 0, then the Auto Enter option has been set and the data string is entered into the associated memory device/location in the system processing and memory means 40 and the focus is changed from the scan-aware custom control 32 to the next control in the tab queue. If the Postprocess property has a value of 1, then the Auto Enter option has not been set and the Check Scanner routine returns back to the Polling Loop and awaits further input from the operator.

Figure 9:
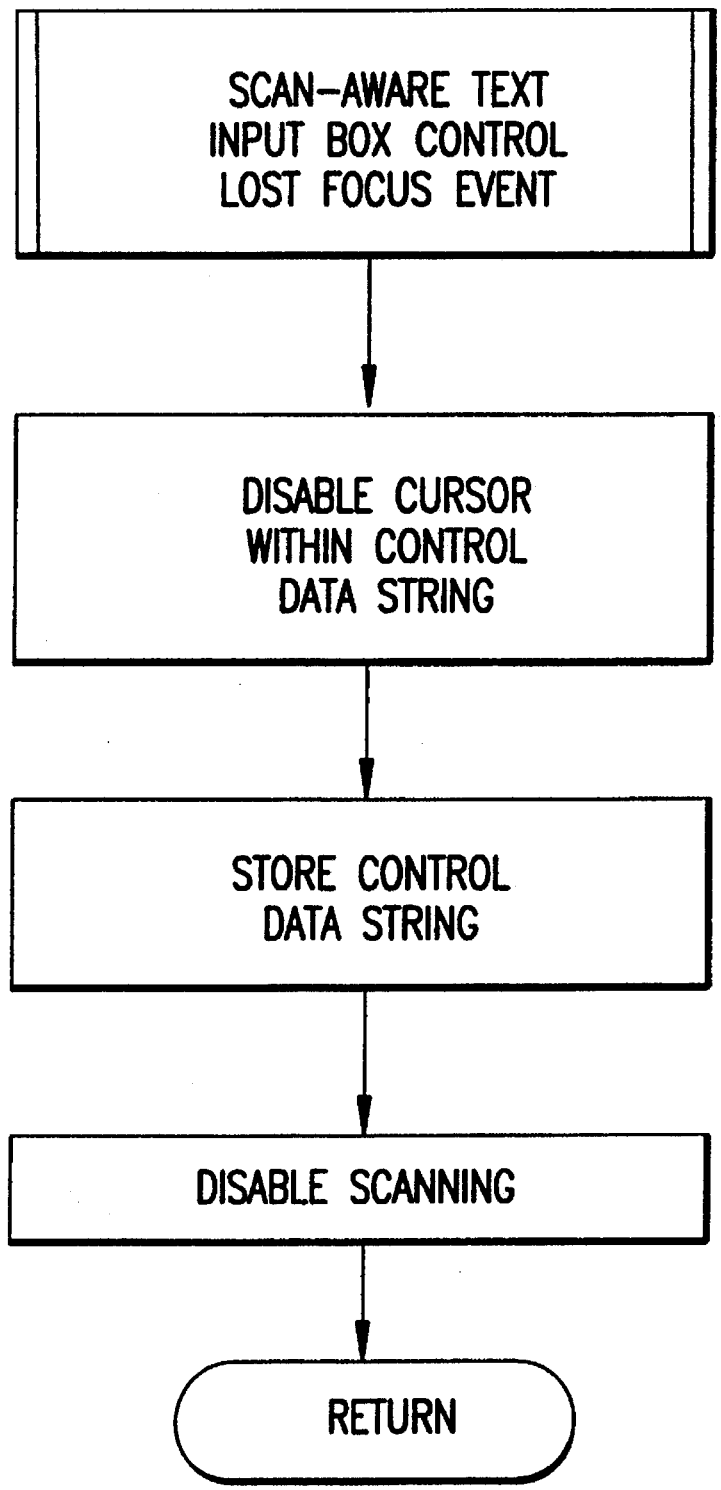
FIG. 9 is a flowchart for the termination process implemented by the scan-aware custom control of the present invention.

As shown in FIG. 9, when the scan-aware custom control 32 loses the focus (i.e. the focus is passed on to another control) the cursor is disabled, the control data string is stored in memory, and the scanner interface 22 is disabled.

Other Custom Properties

In addition to the custom and standard control properties previously described, the scan-aware custom control implements the properties .Mode, .Max, .Path, and .Pattern (which function to provide input validation for the scan-aware custom control), and .Hidden and .Style.

The .Mode custom property sets or returns the type of input thin is allowed in the edit field as follows:

| Setting | Description |
| --- | --- |
| 0 | Standard or masked input is allowed. Valid characters are determined by the .Pattern property. |
| 1 | Same as zero |
| 2 | Positive while numbers from 0 to 9 |
| -2 | Whole numbers (0–9 and hyphen). |
| 3 | Real numbers (0–9, period). |
| -3 | Real numbers (0–9, hyphen and period). |
| 4 | Positive Dollars and Cents (0–9, period). |
| -4 | Dollars and Cents (0–9, hyphen and period). |
| 5 | Auto-decimal positive Dollars and Cents. (0–9 and period). |
| -5 | Auto-decimal Dollars and Cents (0–9, and period). |

The .Pattern custom property sets the mask for the data entered in the field. This property describes the valid characters than can be entered by the operator at the corresponding position in the edit field. .Pattern only applies if .Mode is 0 or 1. When .Mode contains other values, the .Pattern property is not used for masking, but its length can still be used to determine the maximum number of characters that the user can type into the control. The pattern property can contain any of the following characters:

| Setting | Description |
| --- | --- |
| A | Alpha upper case (A–Z). If the user types a lower case letter, the control converts it to upper case. |
| a | A–Z and a–z. |
| 9,N,n,# | 0–9 only |
| B | A–Z and 0–9 with lower to upper case conversion. |
| b | A–Z, a–z, and 0–9. |
| S | Any character allowed, but all lower case characters are converted to upper case. |
| ?,&,s | Any character is allowed. |
| Other | A constant character. No input is allowed at this position in the string |

The .Max custom property sets or returns the maximum number of characters that can be entered into the edit field. When the value is 0, the maximum number of characters that can be entered by the operator is the length of the .Pattern property. Other settings may be any number in the range of 1 to 32,767.

The .Path custom property sets or returns a string that contains a copy of the .text property that includes only the valid characters (not the mask characters). For example, if .Text is "123—456" and .Pattern is "999—999", then .Path returns "123456 ".

The .Hidden custom property provides for password-like input where an asterisk is displayed for all characters entered. When the applications developer sets this property to be True (1), an asterisk is displayed for each character in the field. When set to False (0), the text is displayed in the field as input by the operator in the normal fashion.

The .Style property sets or returns data entry input style characteristics. When .Style is set to 1, all the text in the control is automatically selected each time the control gets the focus. When set to 2, the control always highlights the current selection, even when the control does not have the focus. When set to 4, the control ignores the standard edit keys Cut (Ctl-X), Copy (Ctl-C) and Paste (Ctl-P). When set to 8, the Beep sound which is normally generated when the operator presses an invalid key is turned off. In addition, the applications developer can set combinations of these properties by adding their values (e.g. setting .Style to a value of 3 cause the events for the values of 1 and 2 to occur).

Events

In addition to the standard text box events, the events DblClick and Custom are supported by the scan-aware custom control of the present invention. The DblClick event procedure is executed when a double tap of the stylus 10 is detected in the field 30 associated with the scan-aware custom control 32. In the alternative, when a mouse 14 is connected, a double click of the mouse may be detected in the field 30. The event procedure triggered by the DblClick is defined by the applications developer.

In the preferred embodiment, the DblClick event procedure is configured to call a pop-up style keyboard 33 onto the screen 6 when a double tap of the stylus is detected in the field 30. By using the provided functions GetFocusField and SetFocusField (described below), the data entry field on the popup form can be set to look like the field which was double clicked. Data can be entered by the user on the field 30 via the popup keyboard 33, then SetFocusField can set the new data into the field 30 which was double clicked, generating custom events (SOURCE_KEYBOARD).

The use of a double tap to call the popup keyboard 33 is useful when the operator desires to enter data by keystroke and does not have a keyboard 13 connected to the I/O port 12. This is especially desirable in the preferred embodiment portable terminal 2, where the use of such an external keyboard is unwieldy. By using the popup keyboard 33, the operator can enter data by hand when a bar code is unreadable or when manual data entry is otherwise required.

The Custom event procedure is executed when one of several conditions is true or when a transition from one condition to another is true, and is defined by the applications developer. In the preferred embodiment, the Custom event is used to return certain status conditions and indicates when (1) an invalid key is pressed, (2) the user types a key in the last position in the data entry field, (3) scanned data has been entered in the data entry field, (4) the scanner is ready to scan data if the trigger is pulled, (5) the scanner is not ready to scan data if the trigger is pulled, (6) the scanning laser beam is off, or (7) the scanning laser beam is on.

Two Library functions are supported by the scan-aware custom control; the GetFocusField function and the SetFocusField function. The GetFocusField function is called by the application program to obtain information about the scan-aware custom control which last had the focus such as the fields mask, data, and Max length in order to configure the popup keyboard 33 to appear to the operator like the field 30 with which it is currently associated. The SetFocusField function is used by the application program to store the data entered into the popup keyboard 33 in the scan-aware field 30 that last had the focus.

APPLICATIONS DEVELOPMENT

The scan-aware custom control of the present invention is easily implemented by the application programmer for developing consistent and user-friendly graphical user interface applications. The custom control is accessed by the a developer as a file in an auxiliary library supplied with the applications package, which in the preferred embodiment is Visual Basic for DOS. The developer selects the custom control from the toolbox or pull-down menu as he would any standard prior art control, and sets the aforementioned properties in accordance with the desired mode of operation.

Although the scan-aware custom control of the preferred embodiment has been described with reference to the Visual Basic for DOS environment, it is equally useful when configured to be used in other graphical user interface development environments such as Visual Basic for Windows and the like.

Moreover, it is contemplated that the custom control may be used in any operator environment which is configured to process both automatic data entry, such as the preferred embodiment bar code scanner, and manual data entry from a keyboard or like device. Thus, the custom control is especially useful to integrate magnetic stripe reading devices into such graphical user interfaces with ease both to the operator as well as to the applications developer. By configuring the custom control to interface with the desired automatic data entry device, the custom control provides simple applications development across a multitude of operating systems and environments.

We claim:

1. A method of providing for entry of data by an operator from a bar code scanning device or from a manual keyboard device into a single scan-aware control field on a graphical user interface comprising the steps of:

(a) implementing a polling loop to detect if the operator has selected a key on the manual keyboard device;

(b) selectively inputting into the scan-aware control field, when said polling loop has detected that the operator has selected a key on the manual keyboard device, data indicative of the selected key;

(c) implementing said polling loop with a check scanner routine to detect if bar code data should be entered into said scan-aware control field, said check scanner routine comprising the step of:

i) reading a drive property and exiting said check scanner routine if said drive property indicates that scanning input has not been preselected for said control;

ii) reading an entry mode property to determine if a data lock option has been preselected for said control;

iii) disabling scanning input to said control and exiting said check scanner routine when said data lock out option has been preselected and data is present in said control field otherwise enabling scanning input to said control;

iv) checking a scanner interface buffer to determine if scanner data is present due to the operator scanning a bar code, and exiting said check scanner routine when scanned data is not present otherwise;

v) entering scanned data from said scanner interface buffer to said scan-aware control field when bar code data is present.

* * * * *